(12) United States Patent
Wang et al.

(10) Patent No.: US 10,587,757 B2
(45) Date of Patent: Mar. 10, 2020

(54) METHOD AND APPARATUS FOR PROCESSING TERMINAL THAT IS PERFORMING VOICE SERVICE, AND COMMUNICATIONS SYSTEM

(71) Applicant: Huawei Technologies Co., Ltd., Shenzhen (CN)

(72) Inventors: Zhendong Wang, Shanghai (CN); Yong Yang, Chengdu (CN); Meiyan Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/977,259

(22) Filed: May 11, 2018

(65) Prior Publication Data
US 2018/0262622 A1     Sep. 13, 2018

Related U.S. Application Data

(63) Continuation of application No. PCT/CN2015/094456, filed on Nov. 12, 2015.

(51) Int. Cl.
*H04M 7/00* (2006.01)
*H04W 76/30* (2018.01)
(Continued)

(52) U.S. Cl.
CPC .............. *H04M 7/006* (2013.01); *H04L 5/14* (2013.01); *H04W 76/27* (2018.02); *H04W 76/30* (2018.02);
(Continued)

(58) Field of Classification Search
CPC ..... H04W 88/02; H04W 73/30; H04W 76/27; H04L 5/14
See application file for complete search history.

(56) References Cited

U.S. PATENT DOCUMENTS

2007/0286118 A1* 12/2007 Sohn ................. H04W 76/25
370/328
2008/0232306 A1* 9/2008 Kopplin ............. H04W 76/19
370/328
(Continued)

FOREIGN PATENT DOCUMENTS

CN        101370266 A     2/2009
CN        102227150 A     10/2011

OTHER PUBLICATIONS

"Intra-LTE redirection with GBR preservation," S2-141130 SA WG2 Meeting #102, St. Julians, Malta (Mar. 24-28, 2014).
(Continued)

*Primary Examiner* — Chi Ho A Lee
*Assistant Examiner* — Andrew Lee
(74) *Attorney, Agent, or Firm* — Leydig, Voit & Mayer, Ltd.

(57) ABSTRACT

Embodiments of this application provide a method and an apparatus for processing a terminal that is performing a voice service, and a communications system. In the method, a RAN device actively redirects a voice service terminal, releases an RRC connection of the terminal, and instructs a CN device to retain a GBR bearer of the voice service terminal in a release process. Because a bearer type of a VOIP service is a GBR bearer, a bearer of the VOIP service is not released. When the terminal accesses a network again, the CN device may directly use the GBR bearer to restore the voice service, so as to avoid voice service interruption caused by releasing the bearer of the VOIP service in a redirection process, reduce a call drop rate, and improve user experience.

18 Claims, 6 Drawing Sheets

(51) Int. Cl.
*H04W 76/34* (2018.01)
*H04W 76/27* (2018.01)
*H04L 5/14* (2006.01)
H04W 36/06 (2009.01)
H04W 88/02 (2009.01)

(52) U.S. Cl.
CPC ............ *H04W 76/34* (2018.02); *H04W 36/06* (2013.01); *H04W 88/02* (2013.01)

(56) References Cited

U.S. PATENT DOCUMENTS

| | | | |
|---|---|---|---|
| 2009/0274122 A1 | 11/2009 | Wu | |
| 2010/0142488 A1 | 6/2010 | Zhang et al. | |
| 2012/0039303 A1* | 2/2012 | Stenfelt | H04W 36/0022 370/331 |
| 2014/0192703 A1* | 7/2014 | Chun | H04W 76/40 370/312 |
| 2015/0124735 A1* | 5/2015 | Cho | H04W 72/042 370/329 |
| 2015/0189558 A1* | 7/2015 | Mika | H04W 48/16 370/329 |
| 2018/0270892 A1* | 9/2018 | Choi | H04W 76/27 |
| 2018/0359802 A1* | 12/2018 | Cho | H04L 29/08 |
| 2019/0059119 A1* | 2/2019 | Hapsari | H04W 76/10 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 11)," 3GPP TS 23.401 V11.9.0, 3rd Generation Partnership Project, Valbonne, France (Mar. 2014).
"Handling of Intra-LTE Redirection," 3GPP TSG-RAN WG3 Meeting #84, Seoul, Korea, R3-141156, pp. 1-3, 3rd Generation Partnership Project, Valbonne, France (May 19-23, 2014).
3rd Generation Partnership Project; Technical Specification Group Radio Access Network; Evolved Universal Terrestrial Radio Access Network (E-UTRAN); S1 Application Protocol (S1AP) (Release 13), 3GPP TS 36.413 V13.0.0, pp. 1-302, 3rd Generation Partnership Project, Valbonne, France (Jun. 2015).
"Inter-frequency Intra-LTE redirection with VoLTE call," 3GPP TSG-RAN WG3#83, R3-140204, pp. 1-5, 3rd Generation Partnership Project—Valbonne, France (Feb. 14, 2014).
"Introduction of intra-RAT redirection cause value," 3GPP TSG-RAN WG3#84, R3-141365, p. 1-7, 3rd Generation Partnership Project—Valbonne, France (May 23, 2014).

\* cited by examiner

METHOD AND APPARATUS FOR PROCESSING TERMINAL THAT IS PERFORMING VOICE SERVICE, AND COMMUNICATIONS SYSTEM

CROSS-REFERENCE TO RELATED APPLICATIONS

This application is a continuation of International Application No. PCT/CN2015/094456, filed on Nov. 12, 2015, the disclosure of which is hereby incorporated by reference in its entirety.

TECHNICAL FIELD

This application relates to the field of wireless communications technologies, and in particular, to a method and an apparatus for processing a terminal that is performing a voice service, and a communications system.

BACKGROUND

With development of communications technologies, a radio network continuously evolves. Currently, an all-Internet Protocol (IP) architecture is implemented in a Long Term Evolution (LTE) network. Because the LTE network supports only a packet switched (PS) domain service, a voice service is borne on an IP transport network, and therefore is referred to as a Voice over Internet Protocol (VOIP) service. The VOIP service is also referred to as a VoLTE service in an LTE system.

With large-scale use of the LTE network, the VOIP service is increasingly popular. How to improve voice communication quality is gaining more attention.

SUMMARY

In view of this, embodiments of this application provide a method and an apparatus for processing a terminal that is performing a voice service, and a communications system, to reduce a call drop rate in a voice communication process and improve user experience.

According to a first aspect, this application provides a method for processing a terminal that is performing a voice service. In the method, a RAN device determines to release a radio resource control (RRC) connection of a terminal that is performing a guaranteed bit rate (GBR) bearer-based voice service, and instructs a core network (CN) device to retain a GBR bearer of the terminal in an RRC connection release process of the terminal.

Corresponding to the first aspect, according to a second aspect, this application provides an apparatus for processing a terminal that is performing a voice service. The apparatus is located in a RAN device, and includes a determining unit and an instruction unit. The determining unit is configured to determine to release an RRC connection of a terminal that is performing a GBR bearer-based voice service. The instruction unit is configured to instruct a CN device to retain a GBR bearer of the terminal in an RRC connection release process of the terminal.

Corresponding to the first aspect, according to a third aspect, this application provides a RAN device, including a processor and a memory. The memory is configured to store a program. The processor invokes the program stored in the memory, to perform the method provided in the first aspect of this application.

It can be learned that, in the foregoing aspects, the RAN device actively redirects the voice service terminal, releases the RRC connection of the terminal, and instructs the CN device to retain the GBR bearer of the voice service terminal in the release process. Because a bearer type of the VOIP service is a GBR bearer, the bearer of the VOIP service is not released. When the terminal accesses a network again, the CN device may directly use the GBR bearer to restore the voice service, so as to avoid voice service interruption caused by releasing the bearer of the VOIP service in a redirection process, reduce the call drop rate, and improve user experience.

In the foregoing aspects, the retained GBR bearer may be a GBR bearer of the voice service that is being performed by the terminal (voice GBR bearer), or may be all GBR bearers of the terminal. Compared with retaining all the GBR bearers, retaining the voice GBR bearer is more targeted. This does not affect release of another service GBR bearer, and only the voice service is restored during communication restoration. However, retaining all the GBR bearers is implemented more easily, and the CN device does not need to determine which GBR bearers are voice GBR bearers.

In the foregoing aspects, the RAN device determines, in any one of the following cases, to release the RRC connection of the terminal:

a current serving cell of the terminal cannot meet a quality of service requirement of the voice service that is being performed by the terminal; in this case, the RAN device may initiate release of the RRC connection only when the current serving cell is insufficient to continuously provide the voice service for the terminal, so that the voice service is redirected in a timely manner to a cell that is more suitable for providing a voice service for being continuously performed;

the terminal enters an overlapping area of frequency division duplex (FDD) and time division duplex (TDD), and the terminal does not support switching between the FDD and the TDD; or the terminal enters an overlapping area of inter-frequency cells, and the terminal does not support inter-frequency measurement.

In the latter two cases, the RAN device may initiate release of the RRC connection in a scenario in which call drop may occur, so that the voice service is redirected in a timely manner to an inter-RAN or inter-frequency cell for being continuously performed.

In the foregoing aspects, the RAN device may send a release message to the CN device, to instruct the CN device to retain the GBR bearer of the terminal, where the release message carries an information element that is used to instruct the CN device to retain the GBR bearer of the terminal.

The release message may be an S1 user equipment context release request message. The information element may be cause value information carried in the release message.

The cause value information may be added cause value information in the release message, and is used to indicate that the RRC connection release is performed for the terminal that is performing the GBR bearer-based voice service. The cause value information may also be the following cause value information: user inactivity or inter-radio access technology redirection.

In the foregoing aspects, the RAN device further sends an RRC connection release message to the terminal, to release an air interface resource of the terminal. For example, in the second aspect, the apparatus further includes an air interface releasing unit, and the air interface releasing unit is configured to send the RRC connection release message to the terminal.

According to a fourth aspect, this application further provides a method for processing a terminal that is performing a voice service, where the method is performed by a CN device, and includes:

receiving an instruction sent by a RAN device to the CN device in a process of releasing an RRC connection of a terminal, where the instruction is used to instruct the CN device to retain a GBR bearer of the terminal, and the terminal is performing a GBR bearer-based voice service; and retaining the GBR bearer of the terminal according to the instruction.

Corresponding to the fourth aspect, according to a fifth aspect, this application further provides an apparatus for processing a terminal that is performing a voice service. The apparatus is located in a CN device, and includes a receiving unit and a retaining unit. The receiving unit is configured to receive an instruction sent by a RAN device to the CN device in a process of releasing an RRC connection of a terminal, where the instruction is used to instruct the CN device to retain a GBR bearer of the terminal, and the terminal is performing a GBR bearer-based voice service. The retaining unit is configured to retain the GBR bearer of the terminal according to the instruction.

Corresponding to the fourth aspect, according to a sixth aspect, this application provides a CN device, including a processor and a memory. The memory is configured to store a program. The processor invokes the program stored in the memory, to perform the method provided in the fourth aspect of this application.

In the foregoing aspects, the CN device may further perform the following operation:

when receiving a message for initiating the terminal, sending QoS information of the voice service of the terminal to the RAN device. The CN device may send the QoS information to the RAN device by using an initial user equipment context establishment request. For example, the QoS information is a QCI1. In this case, the CN device may further include a sending unit, and the sending unit is configured to perform the operation.

In the foregoing aspects, the retained GBR bearer may be a GBR bearer of the voice service that is being performed by the terminal (voice GBR bearer), or may be all GBR bearers of the terminal. When the retained GBR bearer is the voice GBR bearer, the CN device may perform the following operation:

determining the voice GBR bearer in the GBR bearers of the terminal. In this case, the CN device may further include a determining unit, and the determining unit is configured to perform the operation.

It can be learned that, in the aspects of this application, the RAN device actively redirects the voice service terminal, releases the RRC connection of the terminal, and instructs the CN device to retain the GBR bearer of the voice service terminal in the release process. Because the bearer type of the VOIP service is the GBR bearer, the bearer of the VOIP service is not released. When the terminal accesses the network again, the CN device may directly use the GBR bearer to restore the voice service, so as to avoid voice service interruption caused by releasing the bearer of the VOIP service in the redirection process, reduce the call drop rate, and improve user experience.

DESCRIPTION OF EMBODIMENTS

In the following, some terms in this application are described, so as to help a person skilled in the art have a better understanding.

(1). A RAN device is a device that connects a terminal to a radio network, and includes but is not limited to: an evolved Node B (eNB), a radio network controller (RNC), a Node B (NB), a base station controller (BSC), a base transceiver station (BTS), a home base station (for example, a Home evolved NodeB, or a Home Node B, HNB), a baseband unit (BBU), a Wifi access point (AP), and the like.

(2). A terminal, also referred to as user equipment (UE), is a device that provides a user with voice and/or data connectivity, for example, a hand-held device having a wireless connection function, an in-vehicle device, and another processing device connected to a wireless modem.

(3). Redirection is an implementation, which is a process of releasing a terminal and enabling the terminal to re-select an access cell. The re-accessed cell may be an original cell or may be an inter-frequency cell or an inter-system cell.

(4). GBR bearer: a dedicated network resource related to a guaranteed bit rate (GBR) bearer is permanently allocated to a bearer by means of a function such as admission control of a RAN device in a bearer establishment or modification process. The bearer is required to guarantee an unchanged bit rate. Otherwise, a bearer that cannot guarantee an unchanged rate is a Non-GBR bearer. According to a characteristic of a VOIP service, a bearer type of the VOIP service is a GBR bearer. A voice service in this application is a GBR bearer-based voice service. For example, a VOIP service is a GBR bearer-based VOIP service.

(5). "Multiple" means two or more. The term "and/or" describes an association relationship between associated objects and indicates that three relationships may exist. For example, A and/or B may represent the following three cases: Only A exists, both A and B exist, and only B exists. The character "/" generally indicates an "or" relationship between the associated objects.

To make the objectives, technical solutions, and advantages of this application clearer, the following describes embodiments of this application with reference to the accompanying drawings. The described embodiments are some rather than all of the embodiments of this application. All other embodiments obtained by a person of ordinary skill in the art based on the embodiments of this application without creative efforts shall fall within the protection scope of this application.

Figure 1:
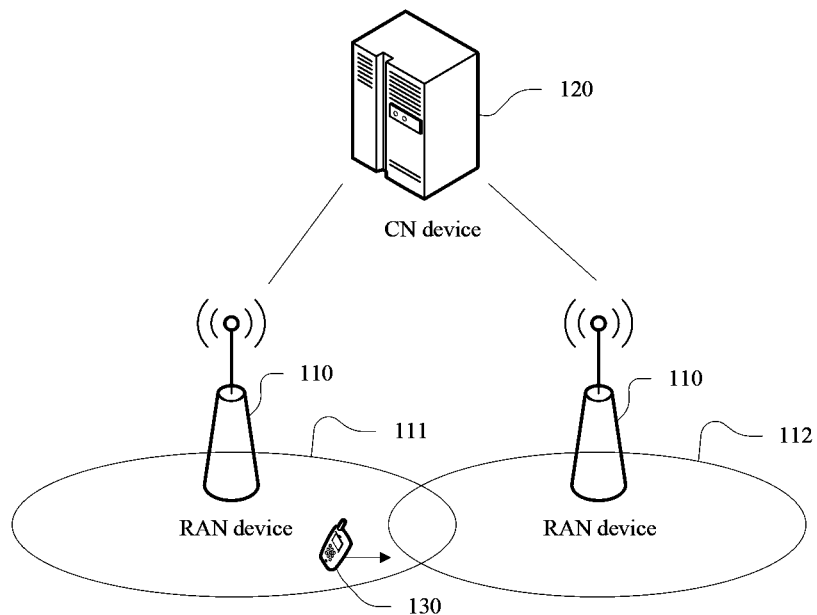
FIG. 1 is a schematic diagram of a communications system according to an embodiment of this application.

Referring to FIG. 1, FIG. 1 is a schematic diagram of a communications system according to an embodiment of this application. As shown in FIG. 1, the communications system includes RAN devices 110 and a core network (CN) device 120. A terminal 130 accesses a radio network through a RAN device 110. The CN device 120 implements mobility management and the like of the terminal, and the terminal communicates with an external network through the CN device 120. If a current serving cell 111 of the terminal 130 has a weak signal, for example, the terminal 130 moves to an edge of the cell 111, the terminal 130 may be handed over, by means of intra-frequency handover or inter-frequency handover, to an intra-frequency/inter-frequency neighboring cell 112 that has a better signal. The handover needs to depend on reporting of a measurement report of the intra-frequency/inter-frequency neighboring cell 112. However, usually, interference at a cell edge is strong and coverage of the cell edge is poor. Once the measurement report of the neighboring cell is not reported to the RAN device 110 in a timely manner due to the interference or the coverage, the RAN device 110 cannot initiate a handover procedure. Alternatively, when the terminal does not support inter-frequency measurement, the measurement report of the inter-frequency neighboring cell cannot be obtained, and the RAN device 110 cannot initiate a handover procedure. In this case, redirection may be initiated and the terminal 130 is released, so that the terminal re-selects an access cell, for example, the cell 112.

However, if redirection is performed on a terminal that is performing a voice service, a GBR bearer is released, and call drop is caused. This severely affects user experience. Therefore, redirection is not performed on the terminal that is performing the voice service. In addition, due to the interference or the coverage of the cell 111, the measurement report of the neighboring cell is not reported to the RAN device 110 in a timely manner. Therefore, the RAN device 110 cannot initiate the handover procedure. This also causes service interruption and call drop. It can be learned that, in this case, the VOIP service interruption and call drop inevitably occur in a prior-art solution.

In this application, a solution is provided for VOIP service interruption occurring in a scenario in which a current serving cell of a terminal is no longer suitable for continuously serving the terminal. In this solution, redirection is still performed on a terminal that is performing a voice service. However, a redirection process is optimized, that is, a radio resource control (RRC) connection of the terminal is still released, and a RAN device instructs a CN device to retain a GBR bearer of the terminal in the redirection process. Because a bearer type of the VOIP service is a GBR bearer, a bearer of the VOIP service is not released. When the terminal accesses a network again (the terminal may access the network through a new cell or may access the network through an original cell), the CN device may directly use the GBR bearer to restore the voice service, so as to avoid voice service interruption caused by releasing the bearer of the VOIP service in the redirection process, reduce a call drop rate, and improve voice communication quality.

Figure 2:
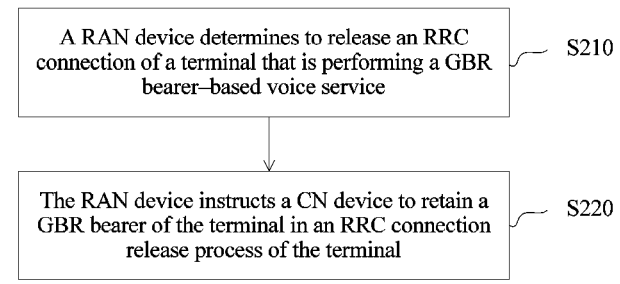
FIG. 2 is a flowchart of a method for processing a terminal that is performing a voice service according to an embodiment of this application.

Referring to FIG. 2, FIG. 2 is a flowchart of a method for processing a terminal that is performing a voice service according to an embodiment of this application. The method is performed by a RAN device. As shown in FIG. 2, the method includes the following steps:

S210. A RAN device determines to release an RRC connection of a terminal that is performing a GBR bearer-based voice service. In the following, the terminal that is performing the voice service is referred to as a voice service terminal, or may be referred to as a VOIP terminal, and may also be referred to as a VoLTE terminal in an LTE system.

S220. The RAN device instructs a CN device to retain a GBR bearer of the terminal in an RRC connection release process of the terminal.

It can be learned that, in this embodiment, the RAN device actively redirects the voice service terminal, releases the RRC connection of the terminal, and instructs the CN device to retain the GBR bearer of the voice service terminal in the release process. Because a bearer type of the VOIP service is a GBR bearer, the bearer of the VOIP service is not released. When the terminal accesses a network again, the CN device may directly use the GBR bearer to restore the voice service, so as to avoid voice service interruption caused by releasing the bearer of the VOIP service in a redirection process, reduce a call drop rate, and improve user experience.

It should be noted that, the voice service in this application is a collective term of a kind of service. This kind of service has a same quality of service (QoS) requirement. The QoS requirement may be reflected by using a QoS class identifier (QCI). Therefore, in step S210, whether the terminal is performing the voice service may be determined by using a QCI.

For example, a QCI1, a QCI2, and a QCI5 are QCIs related to voice. The QCI1 bears a voice service, the QCI2 bears a video service, and the QCI5 bears session initiation protocol (SIP) signaling of a voice service, for example, SIP signaling used for establishing and releasing the voice service. When the voice service is established, SIP signaling is sent to a CN device by using the QCI5, to trigger the CN device to establish a QCI1 bearer for completion. Alternatively, for a videophone, a QCI1 bearer and a QCI2 bearer need to be established for completion. When the voice service is ended, corresponding SIP signaling is transmitted on the QCI5, to trigger the CN device to release the QCI1 for completion. Alternatively, for the videophone service, the CN device is triggered to release the QCI1 and the QCI2 for completion. Then, it is considered that a call is ended. Therefore, to determine whether UE is performing a voice service, a start and an end of the voice service may be determined according to SIP signaling of the QCI5, or whether UE is performing a voice service may be determined according to the QCI1 bearer.

In addition, in step S210, the RAN device may determine, when a current serving cell of the terminal cannot meet a quality of service requirement of the voice service that is being performed by the terminal, to release the RRC connection of the terminal. This case may include but is not limited to any one of the following scenarios:

(a). Uplink coverage of the current serving cell of the terminal cannot meet the quality of service requirement of the voice service that is being performed by the terminal.

(b). Downlink coverage of the current serving cell of the terminal cannot meet the quality of service requirement of the voice service that is being performed by the terminal.

(c). Voice quality of the terminal does not meet a requirement.

(d). The terminal is in a one-way audio state.

(e). Establishment of a voice bearer of the terminal fails.

The foregoing scenarios may be determined by using the following example technical means. However, these are merely examples and are not intended to limit this application. For example, for the scenario of (a) or (b), the RAN device may determine whether uplink signal quality or downlink signal quality meets the quality of service requirement of the voice service for implementation. The uplink signal quality or downlink signal quality may be obtained by using a measurement report reported by the terminal, for example, an A2 measurement report reported by the terminal. For the scenario of (c), uplink or downlink may not be distinguished, and determining is specially performed for the voice service. For example, a quality requirement of voice communication is set by using a threshold of a voice parameter, and whether current voice quality of the terminal meets the requirement is determined by detecting the voice parameter. For example, the voice parameter may include one or more of a voice packet loss, a voice delay, and a voice rate. For the scenario of (d), the RAN device may perform determining based on a status of a received unidirectional voice packet. For example, when an uplink or a downlink voice packet received by the RAN device is 0, the terminal is in the one-way audio state. Alternatively, when an uplink or a downlink packet error probability of a voice packet at a packet data convergence protocol (PDCP) layer is greater than a preset threshold, for example, 80%, the terminal is in the one-way audio state. For the scenario of (e), the RAN device may determine whether a bearer of the terminal that fails to be established is a QCI1 bearer. If the bearer of the terminal that fails to be established is a QCI1 bearer, it is determined that establishment of the voice bearer of the terminal fails.

In addition, the RAN device may also determine, when the terminal enters an overlapping area of frequency division duplex (FDD) and time division duplex (TDD) and the terminal does not support switching between the FDD and the TDD, to release the RRC connection of the terminal. Alternatively, the RAN device may further determine, when the terminal enters an overlapping area of inter-frequency cells and the terminal does not support inter-frequency measurement, to release the RRC connection of the terminal. In conclusion, a case in which the RAN releases the RRC connection of the terminal is not limited in this application. The RRC connection of the terminal may be released provided that the current serving cell is not suitable for continuously serving the terminal.

In step S220, the RAN device may send a release message to the CN device, and add, to the release message, an information element that is used to instruct the CN device to retain the GBR bearer, so as to implement an instruction that is used to instruct the CN device to retain the GBR bearer. The release message may be a UE context release request message. The information element may be cause value information carried in the release message. The cause value information may be added cause value information, and is used to indicate that the release is performed for the voice service terminal. Therefore, the CN device needs to retain the GBR bearer of the voice service terminal. In addition, the cause value information may be existing cause value information that can be used to instruct the CN device to retain the GBR bearer of the terminal, for example, user inactivity or inter-radio access technology redirection (Inter-RAT redirection). Using the UE context release request message may be compatible with an existing protocol, and may reduce a quantity of messages compared with newly adding a message. In addition, in the prior art, the cause value information such as the user inactivity or the inter-radio access technology redirection (Inter-RAT redirection) is used only in a scenario in which a user inactivity timer expires or inter-radio access technology redirection is performed, and cannot be used in the voice service terminal. In this embodiment, the cause value information such as the user inactivity or the inter-radio access technology redirection is used for the voice service terminal, and redirection of the voice service terminal can be implemented directly by using the existing information element. Preferably, using the added cause value information may better distinguish a voice service terminal, and is more targeted compared with using the existing cause value information.

In addition, it should be noted that, the GBR bearer retained by the CN device may be only for the GBR bearer, referred to as a voice GBR bearer, of the voice service that is being performed by the terminal. In this case, the CN device may determine, according to a QCI of the GBR bearer, whether the GBR bearer is the voice GBR bearer. If the GBR bearer is the voice GBR bearer, the voice GBR bearer is retained. Otherwise, the GBR bearer is released. Certainly, the CN device may retain all GBR bearers of the terminal. In this case, the voice GBR bearer is certainly retained, facilitating subsequent restoration of the voice service.

It should be noted that, redirection is an implementation. When a handover process needs to be performed on the terminal, and the handover cannot be implemented due to some reasons, the RAN device delivers an RRC connection release message to the terminal, so that the terminal re-initiates random access and performs the service again. The RRC connection release message may usually carry a frequency, so that the terminal initiates random access in a neighboring cell corresponding to the frequency. The frequency may be a frequency of an inter-frequency/inter-system neighboring cell, so that the terminal can initiate random access in the inter-frequency/inter-system neighboring cell. It can be learned that, like handover, a redirection manner can achieve an objective that the terminal moves between cells. However, in the redirection manner, a process of sending a handover request to a neighboring cell is omitted. Compared with an actual handover manner, the redirection manner has a different manner of processing terminal movement. In addition, the frequency carried in the RRC connection release message may include a frequency of an original cell. Therefore, the terminal may also select the original cell for accessing again.

Figure 3:
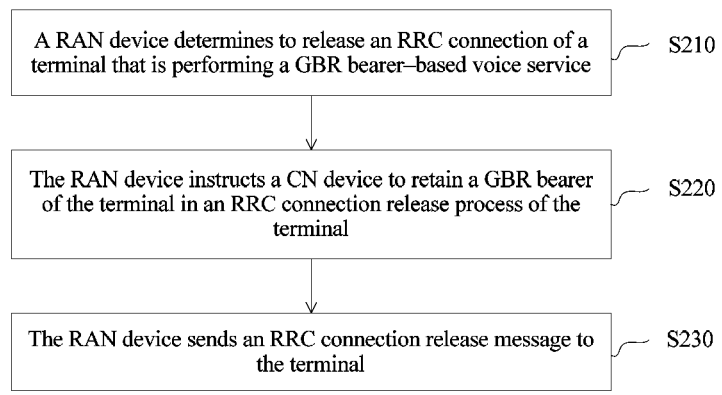
FIG. 3 is a flowchart of another method for processing a terminal that is performing a voice service according to an embodiment of this application.

It can be learned that, the foregoing method may further include a step of sending an RRC connection release message to the terminal. This step is used to release an S1 connection of the terminal. That is, as shown in FIG. 3, the method further includes the following step:

S230. The RAN device sends an RRC connection release message to the terminal.

It should be noted that there is no specific sequence between step S230 and step S220. Step 230 may be performed before step S220, or may be performed after step S220, or may be simultaneously performed with step S220.

Figure 4:
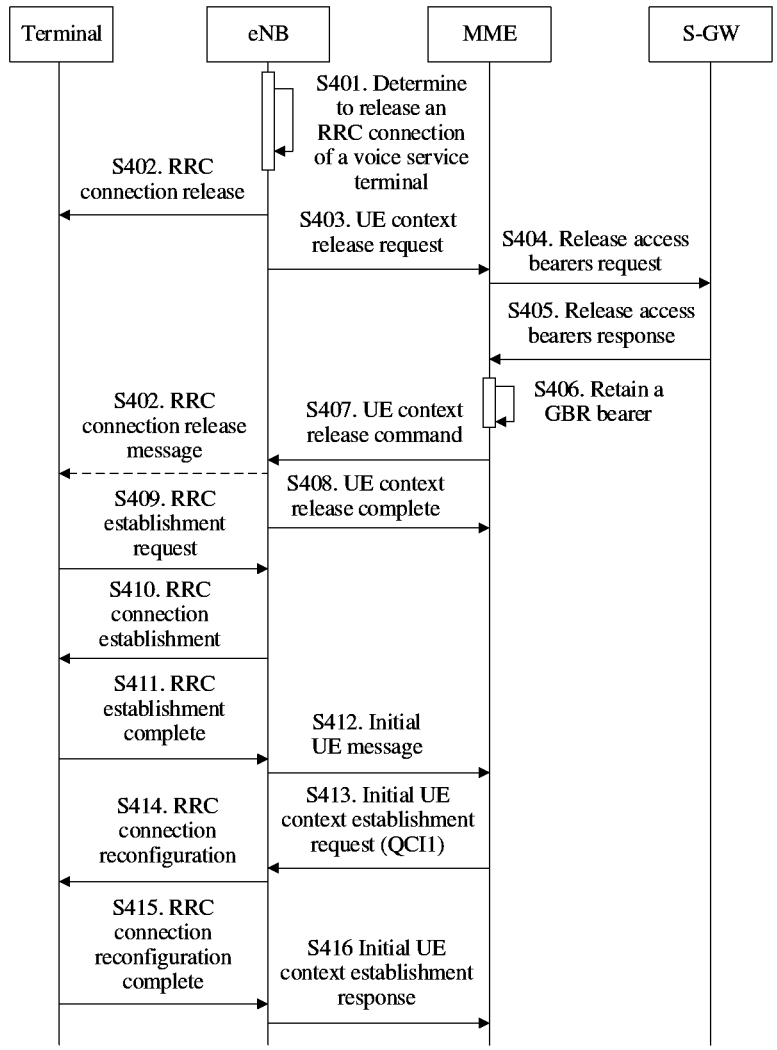
FIG. 4 is a signaling flowchart of a redirection process according to an embodiment of this application.

In the following, an LTE system is used as an example, and the foregoing redirection process is described in detail with reference to a signaling flowchart. In the LTE system, a RAN device is an eNB, and a CN device includes a mobility management entity (MME) and a serving gateway (S-GW). Referring to FIG. 4, FIG. 4 is a signaling flowchart of a redirection process according to an embodiment of this application. As shown in FIG. 4, the process includes the following steps.

S401. An eNB determines to release an RRC connection of a voice service terminal.

How to determine the voice service terminal and how to determine to release the RRC connection of the voice service terminal are the same as those in the foregoing embodiment. Details are not repeatedly described herein.

S402. The eNB sends an RRC connection release message to the voice service terminal, to release an air interface resource of the terminal.

S403. The eNB sends a UE context release request message to an MME. The UE context release request message carries an information element that is used to instruct the MME to retain a GBR bearer of the voice service terminal.

The information element is the same as that described in the foregoing embodiment, and may be cause value information. Details are not repeatedly described herein.

S404. After receiving the UE context release request message sent by the eNB, the MME sends a release access bearers request message to an S-GW. The release access bearers request message is used to instruct the S-GW to release an access bearer of the terminal, that is, an S1 user plane (S1-U) bearer.

S405. The S-GW releases eNB-related information for the voice service terminal, and feeds back a release access bearers response to the MME, to complete release of an access bearer.

In this case, another information element in a S-GW context of the terminal is not affected. The S-GW retains S1-U configuration allocated to the terminal bearer, and starts to buffer a downlink packet of the terminal.

S406. The MME retains (preserve) the GBR bearer of the voice service terminal.

In the prior art, the MME sends a delete bearer command to the S-GW, to release the GBR bearer of the terminal. Herein, the MME may not send the delete bearer command, and retains the GBR bearer of the voice service terminal. In addition, a non-GBR bearer is not deleted in this process, that is, the MME and the S-GW retain the non-GBR bearer. In addition, in step S406, only a voice GBR bearer may be retained and another GBR bearer is released, or all GBR bearers may be retained. Retaining only the voice GBR bearer can ensure that the retained bearer is more targeted, that is, the retained bearer is only for a GBR bearer that bears a voice service, and ensure restoration of the voice service.

S407. The MME sends a UE context release command to the eNB, to release an S1 connection.

If the RRC connection has been released before, for example, S402 in the figure has been performed, that is, an RRC connection release command has been sent to the terminal, the eNB may directly perform the following step S408. Otherwise, after sending the RRC connection release command to the terminal, the eNB performs the following step S408. If the RRC connection release command is sent in an acknowledgement mode, the following step S408 is performed only after an acknowledgement message is received.

S408. The eNB sends a UE context release complete message to the MME.

In this case, for the voice service terminal, a signaling connection between the MME and the eNB has been released. However, the MME retains the GBR bearer of the voice service terminal in the release process. Therefore, when the voice service terminal accesses a network again, the MME may directly establish a voice service bearer by using the GBR bearer, so as to ensure that voice can be continued after the voice service terminal accesses the network again, there is no need to dial again, and user experience is good.

Further referring to FIG. 4, the terminal re-selects an access cell and initiates a random access process. The re-selected cell may be an original cell or may be a new cell. In addition, the new cell and the original cell may be located in a same eNB, or may be located in different eNBs. For brevity, the eNB is identified by using a same node in the figure. However, the node merely indicates that the node is an eNB, and the node may indicate a same eNB or may indicate different eNBs. When re-selecting the cell for accessing, the terminal initiates an RRC connection establishment process to the re-selected cell, and the RRC connection establishment process includes the following steps S409 to S411:

S409. The terminal sends an RRC establishment request message to the eNB.

S410. The eNB sends an RRC connection establishment message to the terminal.

S411. The terminal sends an RRC establishment complete message to the eNB.

After the RRC connection establishment is completed, the eNB sends an initial UE message to the MME (S412), to send a service request to the MME. In this way, the MME may deliver an initial UE context establishment request to the eNB according to the initial UE message (S413). Because the previous GBR bearer of the voice service is not released, the MME may directly add QoS information (for example, a QCI1) of a terminal service to the initial UE context establishment request, so that the eNB establishes a radio bearer based on the QCI1, and configures the terminal, for example, configures a radio parameter and allocates a radio resource. Then, voice communication can be restored. The eNB may establish the radio bearer and configure the terminal in an RRC connection reconfiguration process. Then, the eNB feeds back an initial UE context establishment response to the MME (S416). The RRC connection reconfiguration process includes the following steps:

S414. The eNB sends an RRC connection reconfiguration message to the terminal.

S415. The terminal sends an RRC connection reconfiguration complete message to the eNB.

The following separately describes implementations, in a RAN device, of the method for processing a terminal that is performing a voice service with reference to the accompanying drawings.

Figure 5:
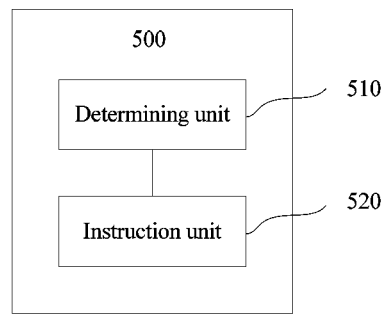
FIG. 5 is a schematic diagram of an apparatus for processing a terminal that is performing a voice service according to an embodiment of this application.

Referring to FIG. 5, FIG. 5 is a schematic diagram of an apparatus for processing a terminal that is performing a voice service according to an embodiment of this application. The apparatus 500 is located in a RAN device. As shown in FIG. 5, the apparatus 500 may include a determining unit 510 and an instruction unit 520. The determining unit 510 is configured to determine to release an RRC connection of a terminal that is performing a GBR bearer-based voice service. The instruction unit 520 is configured to instruct a CN device to retain a GBR bearer of the terminal in an RRC connection release process of the terminal.

The same as that in the foregoing method embodiments, the terminal that is performing the GBR bearer-based voice service may be referred to as a voice service terminal. In addition, the retained GBR bearer may be a voice GBR bearer, or may be all GBR bearers.

A case in which the RRC connection of the voice service terminal is released is the same as that in the foregoing method embodiments, that is, the determining unit 510 determines, in any one of the following cases, to release the RRC connection of the terminal:

a current serving cell of the terminal cannot meet a quality of service requirement of the voice service that is being performed by the terminal;

the terminal enters an overlapping area of FDD and TDD, and the terminal does not support switching between the FDD and the TDD; or the terminal enters an overlapping area of inter-frequency cells, and the terminal does not support inter-frequency measurement.

Details are not repeatedly described, and reference may be made to the foregoing method embodiments.

The instruction unit 520 may instruct the CN device to retain the GBR bearer of the terminal by adding, to a release message, an information element that is used to instruct the CN device to retain the GBR bearer of the terminal, and sending the release message to the CN device. Descriptions about the release message and the information element are the same as those in the foregoing method embodiments. Details are not repeatedly described herein.

Figure 6:
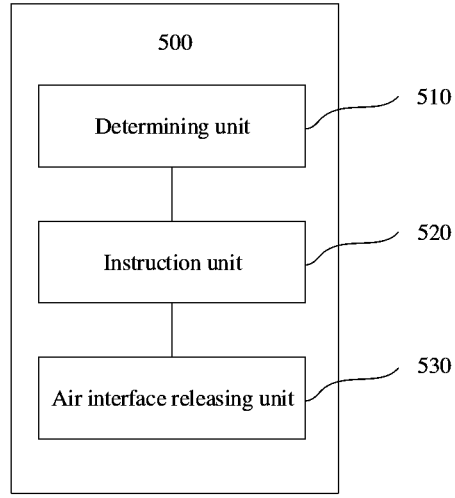
FIG. 6 is a schematic diagram of another apparatus for processing a terminal that is performing a voice service according to an embodiment of this application.

Further referring to FIG. 6, the apparatus 500 may further include an air interface releasing unit 530, and the air interface releasing unit 530 is configured to send an RRC connection release message to the terminal, to release an air interface resource of the terminal.

It should be noted that the foregoing units may be separately disposed processors, or may be integrated into a processor of the RAN device for implementation, or in addition, may be stored in a memory of the RAN device in a form of program code, and the program code is invoked by a processor of the RAN device to perform functions of the foregoing units. In addition, the units may be integrated together, or may be implemented separately. The processor described herein may be a central processing unit (CPU), or an application-specific integrated circuit (ASIC), or one or more integrated circuits configured to implement this embodiment of this application.

Figure 7:
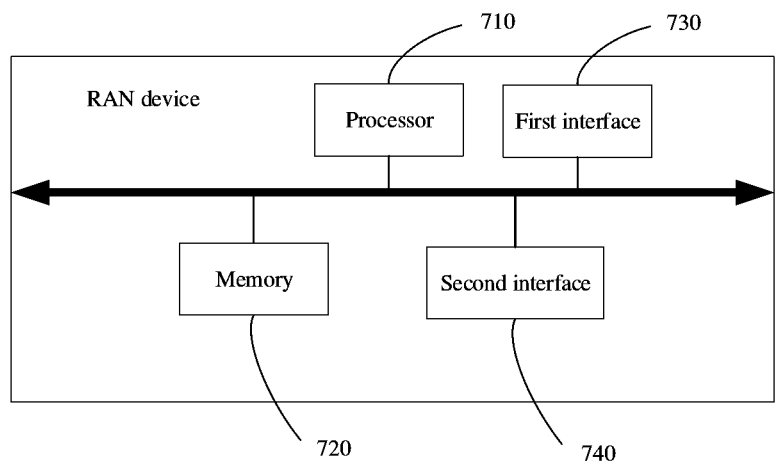
FIG. 7 is a schematic structural diagram of a RAN device according to an embodiment of this application.

For example, referring to FIG. 7, FIG. 7 is a schematic structural diagram of a RAN device according to an embodiment of this application. As shown in FIG. 7, the RAN device includes a processor 710, a memory 720, a first interface 730, and a second interface 740. The memory 720, the first interface 730, and the second interface 740 are connected to the processor 710. The first interface 730 is configured to communicate with a CN device, the second interface 740 is configured to communicate with a terminal, and the memory 720 is configured to store a program.

The processor 710 invokes the program stored in the memory 720, to perform any one of the methods for processing a terminal that is performing a voice service in the foregoing method embodiments, for example, perform the following operations:

determining to release an RRC connection of a terminal that is performing a GBR bearer-based voice service; and instructing a CN device to retain a GBR bearer of the terminal in an RRC connection release process of the terminal.

The same as that in the foregoing method embodiments, the terminal that is performing the GBR bearer-based voice service may be referred to as a voice service terminal. In addition, the retained GBR bearer may be a voice GBR bearer, or may be all GBR bearers.

A case in which the RRC connection of the voice service terminal is released is the same as that in the foregoing method embodiments. Details are not repeatedly described herein.

A manner of instructing the CN device to retain the GBR bearer of the terminal is the same as that in the foregoing method embodiments. The processor 710 may generate a release message, and send the release message to the CN device by using the first interface 730, where the release message carries an information element that is used to instruct the CN device to retain the GBR bearer of the terminal. Descriptions about the release message and the information element are the same as those in the foregoing method embodiments. Details are not repeatedly described herein.

In addition, the processor 710 may further generate an RRC connection release message, and send the RRC connection release message to the terminal by using the second interface 740, to release an air interface resource of the terminal.

It should be noted that the processor 710 herein may be a processor or may be a collective term of multiple processing elements. For example, the processor may be a CPU, an ASIC, or one or more integrated circuits configured to implement this embodiment of this application, for example, one or more microprocessors (digital signal processor, DSP) or one or more field programmable gate arrays (FPGA).

The memory 720 may be a storage apparatus or may be a collective term of multiple storage elements, and is configured to store executable program code, or a parameter, data, and the like that are required for running the RAN device. In addition, the memory 720 may include a random access memory (RAM) or may include a non-volatile memory, such as a magnetic disk memory and a flash memory.

The first interface 730 is configured to communicate with the CN device. The first interface 730 may be a wired interface or may be a wireless interface, for example, may be a fiber interface, to connect to a fiber that is connected to the CN device. This is merely an example, and can be applied to any interface that can communicate with the CN device. The second interface 740 is configured to communicate with the terminal. In terms of implementation, the processor 710 is located in a baseband part, may be connected to a radio frequency part by using the second interface 740, and communicate with the terminal by using the radio frequency part. For example, the second interface 740 may be a common public radio interface (CPRI).

Figure 8:
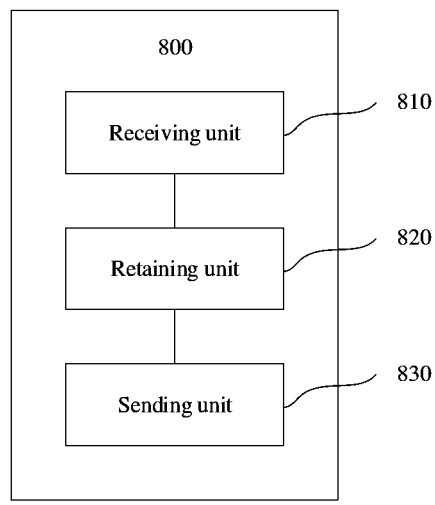
FIG. 8 is a schematic diagram of an apparatus for processing a terminal that is performing a voice service according to an embodiment of this application.

Referring to FIG. 8, FIG. 8 is a schematic diagram of an apparatus for processing a terminal that is performing a voice service according to an embodiment of this application. The apparatus 800 is located in a CN device, and includes a receiving unit 810 and a retaining unit 820. The receiving unit 810 is configured to receive an instruction sent by a RAN device to the CN device in a process of releasing an RRC connection of a terminal. The instruction is used to instruct the CN device to retain a GBR bearer of the terminal, and the terminal is performing a GBR bearer-based voice service. The retaining unit 820 is configured to retain the GBR bearer of the terminal according to the instruction.

When the terminal accesses a radio network again, the RAN device sends an initial terminal message to the CN device, to send a service request of the terminal to the CN device. In this case, because the CN device previously retained the GBR bearer of the terminal, the CN device can send QoS information of the voice service of the terminal such as a QCI1 to the RAN device, to restore the voice service of the terminal. Further referring to FIG. 8, in this case, the apparatus 800 may further include a sending unit 830, and the sending unit 830 is configured to: when receiving a message for initiating the terminal, send QoS information of the voice service of the terminal to the RAN device. The CN device may send the QoS information to the RAN device by using an initial user equipment context establishment request. For example, the QoS information is a QCI1.

Figure 9:
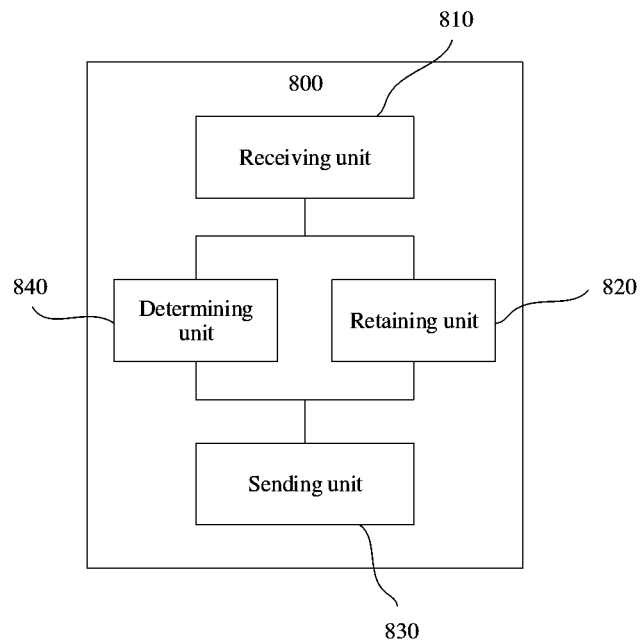
FIG. 9 is a schematic diagram of another apparatus for processing a terminal that is performing a voice service according to an embodiment of this application.

The same as that in the foregoing embodiment, the GBR bearer retained by the apparatus 800 may be a voice GBR bearer, or may be all GBR bearers. Referring to FIG. 9, when the retained GBR bearer is the voice GBR bearer, the apparatus 800 may further include a determining unit 840, and the determining unit 840 is configured to determine the voice GBR bearer in the GBR bearers of the terminal. Then, the retaining unit 820 is notified of retaining the voice GBR bearer.

It should be noted that the foregoing units may be separately disposed processors, or may be integrated into a processor of the CN device for implementation, or in addition, may be stored in a memory of the CN device in a form of program code, and the program code is invoked by a processor of the CN device to perform functions of the foregoing units. In addition, the units may be integrated together, or may be implemented separately. The processor described herein may be a central processing unit (CPU), or an application-specific integrated circuit (ASIC), or one or more integrated circuits configured to implement this embodiment of this application. In addition, the receiving unit 810 and the sending unit 830 may receive information from the RAN device and send information to the RAN device through a communication interface between the CN device and the RAN device.

Figure 10:
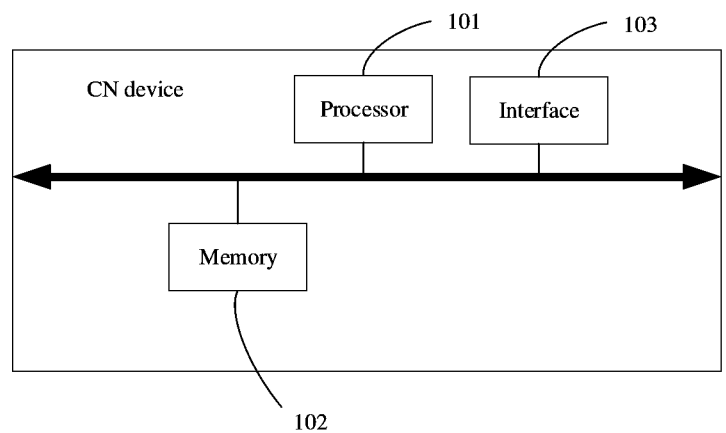
FIG. 10 is a schematic structural diagram of a CN device according to an embodiment of this application.

For example, referring to FIG. 10, FIG. 10 is a schematic structural diagram of a CN device according to an embodiment of this application. As shown in FIG. 10, the CN device includes a processor 101, a memory 102, and an interface 103. The memory 102 and the interface 103 are connected to the processor 101. The interface 103 is configured to communicate with a RAN device, and the memory 102 is configured to store a program.

The processor 101 invokes the program stored in the memory 102, to perform any one of the methods that are performed by a CN device in the foregoing method embodiments and that are for processing a terminal that is performing a voice service, for example, perform the following operations:

receiving an instruction sent by a RAN device to the CN device in a process of releasing an RRC connection of a terminal, where the instruction is used to instruct the CN device to retain a GBR bearer of the terminal, and the terminal is performing a GBR bearer-based voice service; and retaining the GBR bearer of the terminal according to the instruction.

When the terminal accesses a radio network again, the RAN device sends an initial terminal message to the CN device, to send a service request of the terminal to the CN device. In this case, because the CN device previously retained the GBR bearer of the terminal, the CN device can send QoS information of the voice service of the terminal such as a QCI1 to the RAN device, to restore the voice service of the terminal. In this case, the foregoing program further includes an instruction used for performing the following operation:

when receiving a message for initiating the terminal, sending QoS information of the voice service of the terminal to the RAN device. For example, the CN device may send the QoS information to the RAN device by using an initial user equipment context establishment request. For example, the QoS information is a QCI1.

In addition, the retained GBR bearer may be a voice GBR bearer, or may be all GBR bearers. When the retained GBR bearer is the voice GBR bearer, the foregoing program further includes an instruction used for performing the following operation:

determining the voice GBR bearer in the GBR bearers of the terminal.

A case in which the RRC connection of the voice service terminal is released and a manner of instructing the CN device to retain the GBR bearer of the terminal are the same those in the foregoing method embodiments. Details are not repeatedly described herein.

It should be noted that the processor 101 herein may be a processor or may be a collective term of multiple processing elements. For example, the processor may be a CPU, an ASIC, or one or more integrated circuits configured to implement this embodiment of this application, for example, one or more microprocessors (digital signal processor, DSP) or one or more field programmable gate arrays (FPGA).

The memory 102 may be a storage apparatus or may be a collective term of multiple storage elements, and is configured to store executable program code, or a parameter, data, and the like that are required for running the RAN device. In addition, the memory 102 may include a random access memory (RAM) or may include a non-volatile memory, such as a magnetic disk memory and a flash memory.

The interface 103 is configured to communicate with the RAN device. The interface 103 may be a wired interface or may be a wireless interface, for example, may be a fiber interface, to connect to a fiber that is connected to the RAN device. This is merely an example, and can be applied to any interface that can communicate with the RAN device.

With descriptions of the foregoing embodiments, a person skilled in the art may clearly understand that this application may be implemented by hardware, firmware, or a combination thereof. When this application is implemented by software, the foregoing functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a computer. The following provides an example but does not impose a limitation: The computer readable medium may include a RAM, a ROM, an EEPROM, a CD-ROM or another optical disc storage, a disk storage medium or another magnetic storage device, or any other medium that can carry or store expected program code in a form of an instruction or a data structure and can be accessed by a computer. In addition, any connection may be appropriately defined as a computer readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong.

In summary, what is described above is merely example embodiments of the technical solutions of this application, but is not intended to limit the protection scope of this application. Any modification, equivalent replacement, or improvement made without departing from the principle of this application shall fall within the protection scope of this application.

What is claimed is:

1. A method for processing a terminal, the method comprising:

determining, by a radio access network (RAN) device, to release a radio resource control (RRC) connection of a terminal, wherein the terminal is performing a guaranteed bit rate (GBR) bearer-based voice service; and sending, by the RAN device, a release message to a core network (CN) device in an RRC connection release process of the terminal, wherein the release message carries an information element that is used to instruct the CN device to retain a GBR bearer of the terminal, wherein the information element is cause value information, and the cause value information is user inactivity or inter-radio access technology redirection.

2. The method according to claim 1, wherein the retained GBR bearer is a GBR bearer of the voice service that is being performed by the terminal, or all GBR bearers of the terminal.

3. The method according to claim 1, wherein the RAN device determines to release the RRC connection of the terminal when at least one of:

a current serving cell of the terminal cannot meet a quality of service requirement of the voice service that is being performed by the terminal;

the terminal enters an overlapping area of frequency division duplex (FDD) and time division duplex (TDD), and the terminal does not support switching between the FDD and the TDD; and the terminal enters an overlapping area of inter-frequency cells, and the terminal does not support inter-frequency measurement.

4. The method according to claim 1, wherein the release message comprises an S1 user equipment context release request message.

5. The method according to claim 1, wherein the cause value information is used to indicate that the RRC connection release is performed for the terminal that is performing the GBR bearer-based voice service.

6. The method according to claim 1, further comprising:

sending, by the RAN device, an RRC connection release message to the terminal.

7. An apparatus for processing a terminal, comprising a processor and a non-transitory computer readable storage medium, the non-transitory computer readable storage medium stores a program, and when the program is executed by the processor, the following steps are performed:

determining to release a radio resource control (RRC) connection of the terminal, wherein the terminal is performing a guaranteed bit rate (GBR) bearer-based voice service; and sending a release message to a core network (CN) device in an RRC connection release process of the terminal, wherein the release message carries an information element that is used to instruct the CN device to retain a GBR bearer of the terminal, wherein the information element is cause value information, and the cause value information is user inactivity or inter-radio access technology redirection.

8. The apparatus according to claim 7, wherein the retained GBR bearer is a GBR bearer of the voice service that is being performed by the terminal, or all GBR bearers of the terminal.

9. The apparatus according to claim 7, wherein the RRC connection of the terminal is determined to be released when at least one of:

a current serving cell of the terminal cannot meet a quality of service requirement of the voice service that is being performed by the terminal;

the terminal enters an overlapping area of frequency division duplex (FDD) and time division duplex (TDD), and the terminal does not support switching between the FDD and the TDD; and the terminal enters an overlapping area of inter-frequency cells, and the terminal does not support inter-frequency measurement.

10. The apparatus according to claim 7, wherein the release message comprises an S1 user equipment context release request message.

11. The apparatus according to claim 7, wherein the cause value information is used to indicate that the RRC connection release is performed for the terminal that is performing the GBR bearer-based voice service.

12. The apparatus according to claim 7, when the program is executed by the processor, the following step is further performed:

sending an RRC connection release message to the terminal.

13. A non-transitory computer readable medium comprising a program, wherein when the program is executed by a processor, the following steps are performed:

determining to release a radio resource control (RRC) connection of a terminal, wherein the terminal is performing a guaranteed bit rate (GBR) bearer-based voice service; and sending a release message to a core network (CN) device in an RRC connection release process of the terminal, wherein the release message carries an information element that is used to instruct the CN device to retain a GBR bearer of the terminal, wherein the information element is cause value information, and the cause value information is user inactivity or inter-radio access technology redirection.

14. The non-transitory computer readable medium according to claim 13, wherein the retained GBR bearer is a GBR bearer of the voice service that is being performed by the terminal, or all GBR bearers of the terminal.

15. The non-transitory computer readable medium according to claim 13, wherein the RRC connection of the terminal is determined to be released when at least one of:

a current serving cell of the terminal cannot meet a quality of service requirement of the voice service that is being performed by the terminal;

the terminal enters an overlapping area of frequency division duplex (FDD) and time division duplex (TDD), and the terminal does not support switching between the FDD and the TDD; and the terminal enters an overlapping area of inter-frequency cells, and the terminal does not support inter-frequency measurement.

16. The non-transitory computer readable medium according to claim 13, wherein the release message comprises an S1 user equipment context release request message.

17. The non-transitory computer readable medium according to claim 13, wherein the cause value information is used to indicate that the RRC connection release is performed for the terminal that is performing the GBR bearer-based voice service.

18. The non-transitory computer readable medium according to claim 13, when the program is executed by the processor, the following step is further performed:

sending an RRC connection release message to the terminal.

* * * * *